United States Patent [19]
Gaupp

[11] Patent Number: 5,375,054
[45] Date of Patent: Dec. 20, 1994

[54] CONVERTER BRIDGE HAVING TWO HALF-BRIDGES CONNECTED BY BUS BARS

[75] Inventor: Osvin Gaupp, Baden, Switzerland

[73] Assignee: ABB Management AG, Baden, Switzerland

[21] Appl. No.: 192,624

[22] Filed: Feb. 7, 1994

[30] Foreign Application Priority Data

Feb. 5, 1993 [DE] Germany .................. 4303317

[51] Int. Cl.⁵ ............................ H02M 7/5387
[52] U.S. Cl. ............................. 363/132; 363/17
[58] Field of Search ............... 363/17, 27, 28, 96, 363/98, 132, 136, 144; 361/611, 624, 637, 638, 648, 649; 174/68.2, 70 B, 71 B, 99 B

[56] References Cited

U.S. PATENT DOCUMENTS

| | | | |
|---|---|---|---|
| 4,768,141 | 8/1988 | Hubertus et al. | 363/97 |
| 4,822,951 | 4/1989 | Wilson et al. | 174/68.2 |
| 5,010,471 | 4/1991 | Klaassens et al. | 363/160 |
| 5,113,337 | 5/1992 | Steigerwald | 363/132 |
| 5,253,157 | 10/1993 | Severinsky | 363/98 |
| 5,272,591 | 12/1993 | Blue et al. | 361/637 |
| 5,291,383 | 3/1994 | Oughton | 363/17 |

FOREIGN PATENT DOCUMENTS

| | | | |
|---|---|---|---|
| 0254911 | 2/1988 | European Pat. Off. | H02M 5/27 |
| 2317117 | 10/1974 | Germany | H01L 1/16 |
| 2739245 | 12/1978 | Germany | H02M 7/04 |
| 3214233 | 10/1983 | Germany | H01L 25/10 |
| 3529182 | 2/1987 | Germany | H02M 7/06 |

Primary Examiner—Steven L. Stephan
Assistant Examiner—Matthew Nguyen
Attorney, Agent, or Firm—Oblon, Spivak, McClelland, Maier & Neustadt

[57] ABSTRACT

A converter bridge includes at least two half bridges, which are connected together by bus bars. The bus bars include at least two directly opposite bus bar segments and are arranged mirror symmetrically relative to a median plane in the converter bridge. The directly opposite bus bar segments exhibit a relatively small line cross section. Due to the mirror symmetrical arrangement, a high frequency secondary current component, which flows in the opposite direction and belongs to the current flowing through the bus bars, is concentrated in the directly opposite segments of the bus bar and is damped effectively via the relatively small line cross section. In contrast, the low frequency main current component flows in essence uniformly distributed over the profile of the bus bar.

6 Claims, 4 Drawing Sheets

CONVERTER BRIDGE HAVING TWO HALF-BRIDGES CONNECTED BY BUS BARS

TECHNICAL FIELD

The present invention relates to the field of power electronics and, more specifically, to a converter bridge which includes two half bridges connected together by bus bars.

BACKGROUND OF THE ART

A converter bridge is known, for example, from the European patent publication EP-B1 0 254 911.

The converter bridge in this publication is a so-called two point converter, which is constructed in essence from two half bridges or converter switching poles. Each half bridge comprises two switchable thyristors (e.g. GTOs), which are connected in series and to which a free-wheeling diode is inversely parallelly connected. A supporting capacitor is connected parallel to each converter switching pole. The converter switching poles are connected to a converter bridge by means of connecting bars or bus bars.

A direct current source is connected to these bus bars. The GTOs are switched on and off only so that alternating current flows through the load. In addition, a high frequency, parasitic oscillating current is created, through the switching operation of the GTOs, in the oscillating circuit, formed by means of the supporting capacitors and the inductances of the bus bars. In addition to the operating current, this high frequency oscillating current also loads the bus bars and the supporting capacitors. Thus, it represents an undesired disturbing component, such that, on the one hand, the losses rise and, on the other hand, the converter is unnecessarily loaded.

SUMMARY OF THE INVENTION

The object of the invention is to provide a converter which minimizes the losses produced by the oscillating current without affecting simultaneously the operating current. This problem with the converter of the aforementioned kind is solved by means of the features of the present invention.

Thus, the essence of the invention is that the bus bars comprise at least two segments and that two bus bars, connecting two half bridges, lie close together and are mirror symmetrical with respect to a median plane. In such a configuration the high frequency oscillating current components that flow in opposite directions are concentrated in the directly opposite segments of the bus bar, whereas the main current component flows are in essence uniformly distributed in the entire bus bar.

If at this stage the directly opposite segments of the bus bars exhibit a relatively small line cross section, the disturbing, high frequency oscillating current component is effectively dumped.

In a preferred embodiment the bus bars comprise two legs which are allocated to the bus bar segments. Thus, the bus bar exhibits altogether an L-shaped profile.

Thus, the advantage of the design according to the invention is that the high frequency, disturbing oscillating currents are effectively damped by means of the two-part structure of the bus bar without having an unnecessary negative impact on the main current component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
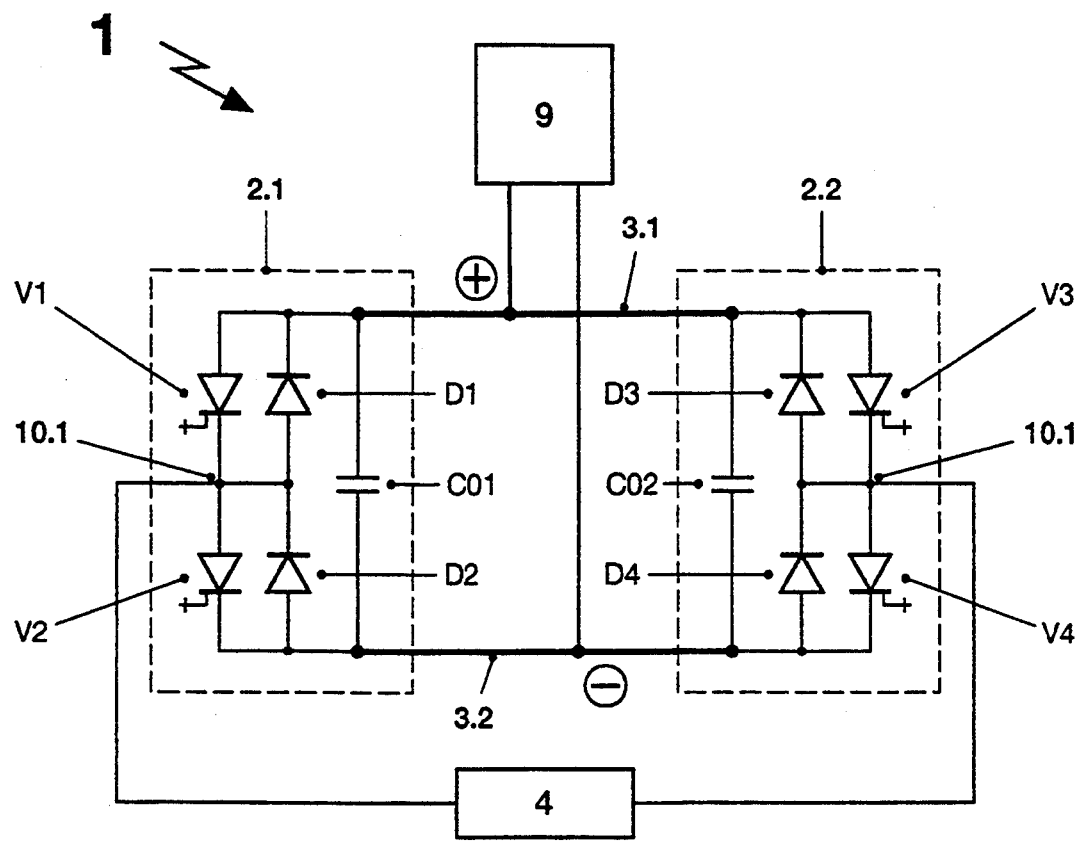
FIG. 1 depicts a converter bridge comprising two half bridges.

FIG. 1 depicts a converter bridge 1 which comprises at least two half bridges 2.1, 2.2. Each half bridge 2.1, 2.2 exhibits two valves V1-4, which are connected in series, e.g. thyristors that can be switched off (GTO), also non-parallel free-wheeling diodes D1-4 and a supporting capacitor CO1, CO2. Two half bridges are connected by way of two bus bars 3.1, 3.2. A direct current source 9 can be connected to these bus bars 3.1, 3.2. Each half bridge 2.1, 2.2 exhibits a load connection 10.2. A load 4 can be connected to these load connections 10.1, 10.2.

In service either the positive or the negative connection (+, −) of the direct current source 9 is switched through to the load. For this purpose, the valves V1-4 are selected according to a specific process, the details of which will not be explained here. In this manner an essentially sinusoidal voltage or a sinusoidal current of the desired frequency is produced.

This frequency can amount to 16.67 Hz in the example of converter bridges for railway facilities.

At the same time, however, a high frequency secondary current component is superimposed on this low frequency main current component, said secondary current component results from the switching of the valves V1-4 creating the oscillating circuit, formed by means of the supporting capacitors CO1, and CO2 and the inductance of the bus bars. Since the ohmic resistance of the bus bars should be as small as possible, the result is a weakly damped, high frequency oscillation, whose effective values assume a few hundred amperes. This high frequency oscillation puts a significant load on the supporting capacitors and the bus bars.

The effect of the high frequency oscillation can be decreased by damping more of the oscillation. The simplest method is to insert resistors. However, such resistors also increase the losses for the main current component. Moreover, a converter bridge, where only the high frequency secondary current component can be damped selectively, would be desirable. In the present invention this feature is achieved by means of specially shaped bus bars.

The concept of the present invention consists of the bus bars 3.1, 3.2 comprising at least two segments 8.1, 8.2 (see FIG. 2), where the one segment 8.1 carries in essence the main current component and the second segment 8.2 carries the secondary current component. Thus, both current components can be separately damped.

The division of the current components in the bus bar 3.1, 3.2 is based on the current displacement effect in two parallel conductors.

The magnetic alternating field, induced by the alternating currents in the conductors, induces in each conductor eddy currents. Said eddy currents are superimposed on the conductor current and cause a nonuniform distribution of the current over the conductor cross section, which is called current displacement. Currents that flow in the opposite direction cause in general a current displacement toward the inside, i.e. in the direction of the adjacent conductor, whereas parallel flowing currents are displaced toward the outside. The current displacement depends on the frequency of the alternating current, the distance between the conductors and the conductor materials. The higher the frequency, the greater the current displacement. The greater the distance between two conductors, the smaller the displacement.

In the present converter the secondary current component flows as the high frequency transient oscillation from the first bus bar 3.1, over the first supporting capacitor CO1, over the second bus bar 3.2, and over the second supporting capacitor CO1 back to the first bus bar 3.1. Thus, the secondary current component flows in the bus bars 3.1, 3.2 in the opposite direction. In contrast, the low frequency main current component flows parallel either only in one bus bar or in both.

This embodiment of the invention can be constructed by arranging the two bus bars 3.1, 3.2 close together locally and mirror symmetrically positioned relative to a median plane 7 that is situated therebetween. Since the bus bars are made of two segments 8.1, 8.2, the secondary current component as concentrated primarily in those segments 8.2 that are directly opposite. In contrast, the main current component is in essence uniformly distributed or concentrated in those segments 8.1 that are further away from the median plane 7, depending on whether the main current component flows only in one bus bar or in both bus bars.

At this stage, in particular, the line cross section of that segment of the bus bar 8.2 that is allocated to the secondary current component can be made small. In this manner the secondary current component is effectively damped without having a negative impact on the main current component.

Figure 2:
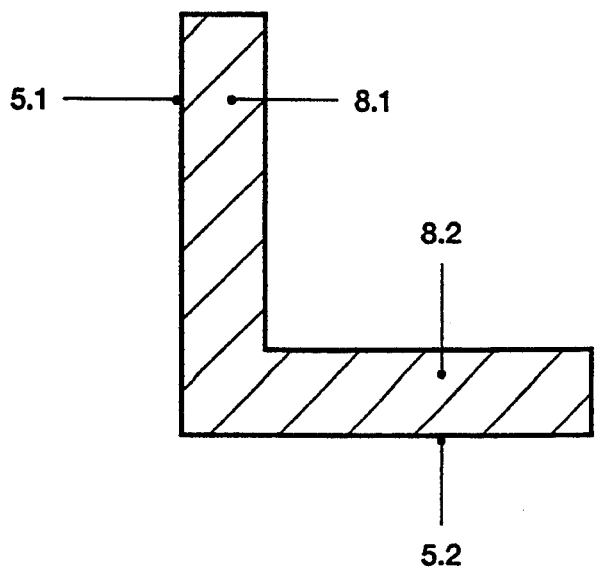
FIG. 2 is a side view of a bus bar according to the invention.
Figure 3:
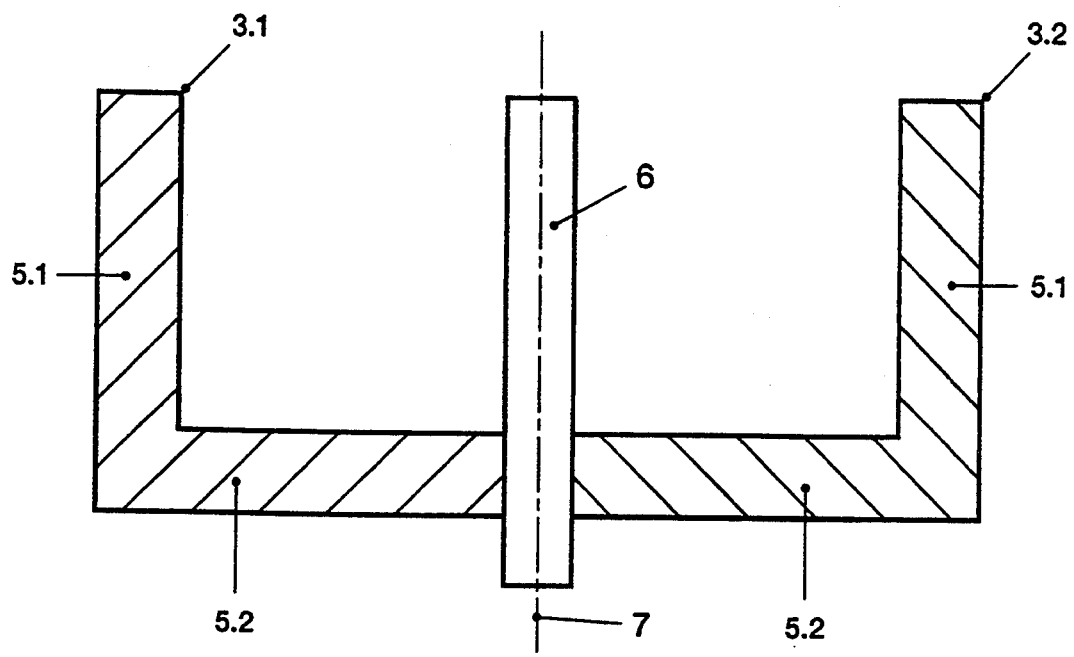
FIG. 3 is a side view of the arrangement of two bus bars according to the invention.

In the preferred embodiment shown in FIG. 2, the bus bars 3.1, 3.2 each comprise in essence two legs 5.1, 5.2. These legs form the bus bar segments 8.1, 8.2. Together they form an L-shaped profile. The two bus bars 3.1, 3.2 are arranged close together in the converter and are mirror symmetrically positioned relative to a median plane 7. This state is shown in FIG. 3. The bus bar segments 8.2 that face the median plane 7 exhibit, owing to their L-shaped profile, a small line cross section, whereas the segments 8.1, which extend from the top to the bottom in FIG. 3 and are further away from the median plane, exhibit a relatively large line cross section.

Two bus bars form together an interrupted U-shaped profile. Preferably the gap between the two bus bars 3.1, 3.2 is filled with an insulator 6 along the median plane 7.

In service the secondary current component is now concentrated in the immediately opposite legs 5.2 of the bus bar. Since they exhibit, owing to their shape, a smaller line cross section than the legs 5.1, which are further away from the median plane 7, the secondary current component is effectively damped without having a negative effect on the main current component.

Measurements and simulations have explicitly proven this spatial division of the main and secondary current components in the bus bars.

In the following discussion, only one bus bar is described. One has to imagine the second bus bar as being mirror symmetrical positioned relative to the left edge of FIGS. 4 and 6. At the same time this left edge of the picture represents the median plane 7.

Figure 4:
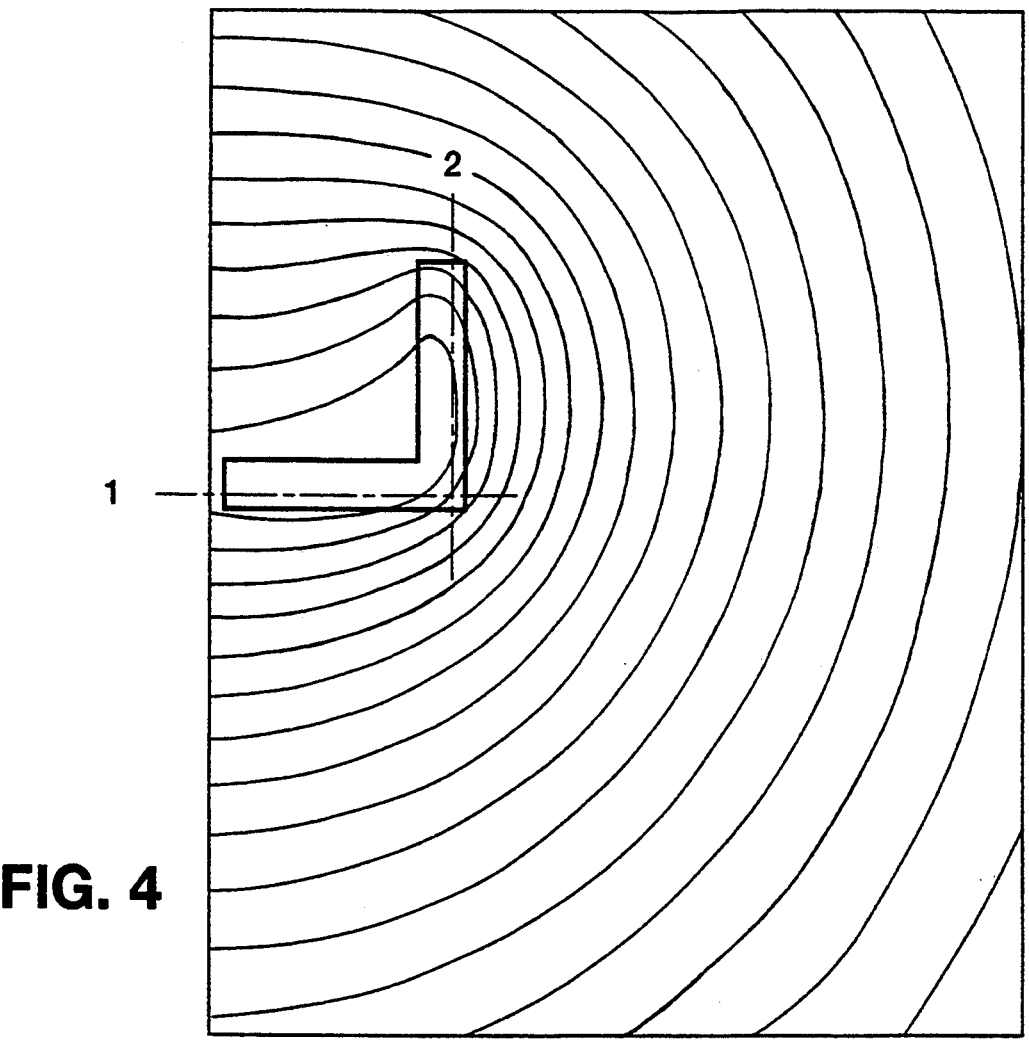
FIG. 4 depicts the qualitative course of the magnetic field lines along the profile of a bus bar according to the invention for the main current component.
Figure 5A:
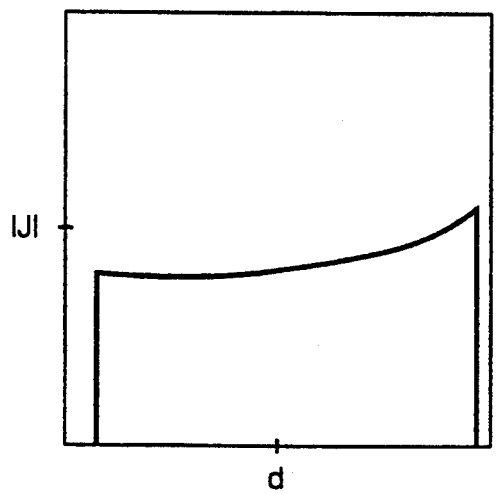
FIGS. 5a, 5b depict the qualitative course of the current density along the axes "1" and "2".
Figure 5B:
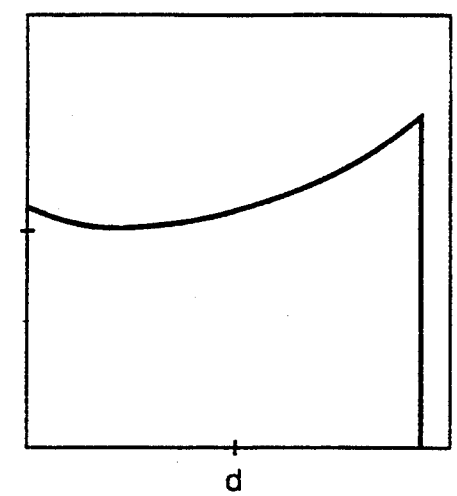

FIG. 4 shows the qualitative course of the magnetic field lines for the parallel flowing currents of 16.67 Hz. As follows from the field lines and the resulting current densities along the axes "1" and "2", shown qualitatively in FIGS. 5a and 5b, the main current component is in essence uniformly distributed.

Figure 6:
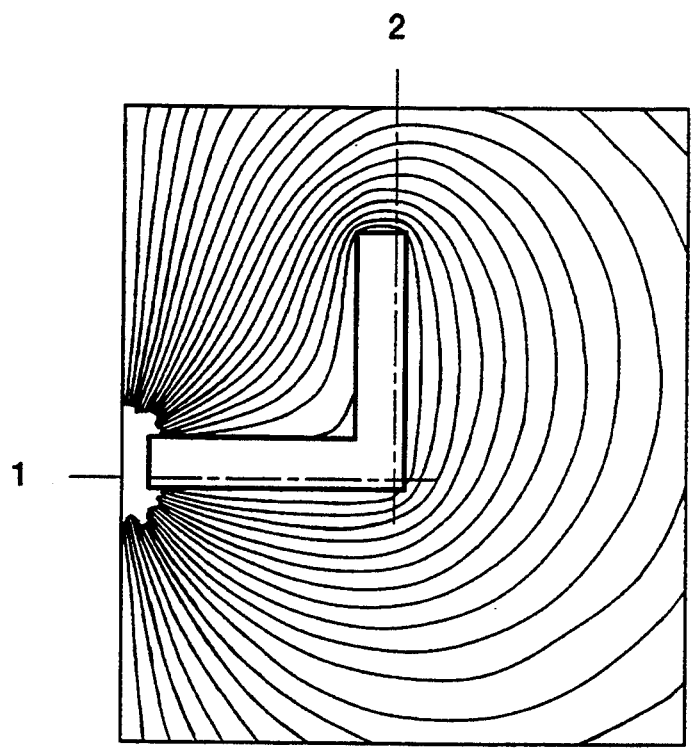
FIG. 6 depicts the qualitative course of the magnetic field lines along the profile of a bus bar according to the invention for the high frequency oscillating current.
Figure 7A:
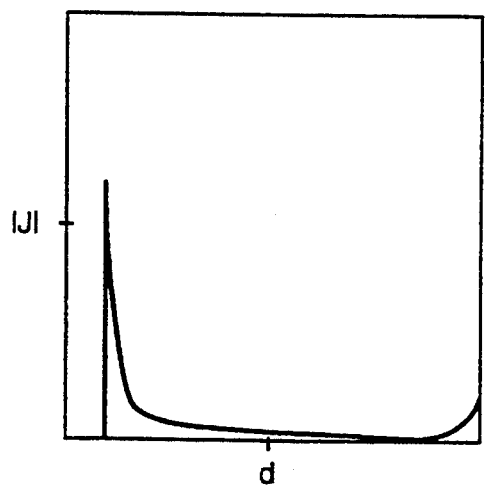
FIGS. 7a, 7b depict the qualitative course of the current density along the axes "1" and "2".
Figure 7B:
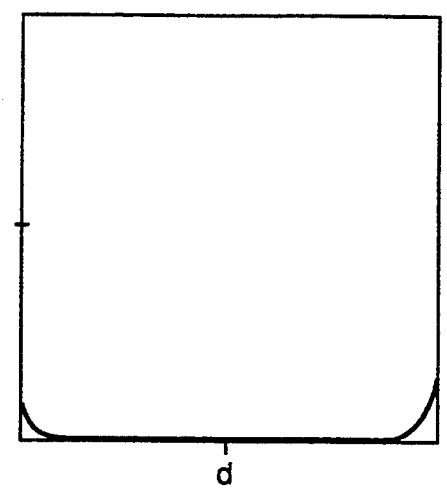

The situation is totally different for currents of approximately 2.7 kHz flowing in the opposite direction. This situation is shown in FIGS. 6 and 7a, b. The field lines for the secondary current component are concentrated in that segment of the leg 5.2 that lies close to the median plane 7. This is also shown in the current density distribution along the axes "1" and "2". The largest component of the high frequency oscillating current is concentrated in that segment of the leg 5.2 that lies directly at the median plane or directly opposite the second bus bar.

Up to this point only an L-shaped profile was under discussion. However, it is also conceivable that the bus bars exhibit, e.g., a T-shaped profile. Similarly those legs that face the median plane can also exhibit a flattened off profile, so that the line cross section is made even smaller in the direction of the median plane.

Thus, the invention provides on the whole a converter bridge, where the high frequency compensating currents can be damped independently of the main current component.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A converter bridge which comprises:
   a) at least two half bridges each of which exhibits a positive connection and a negative connection and to which a direct current source is connected, and
   b) a first bus bar and a second bus bar over which are respectively connected to the positive and negative connections of the half bridges wherein a current flowing through the first and second bus bars exhibits a low frequency main current component and a high frequency secondary current component flowing in the opposite direction in the first and second bus bars, wherein the first and second bus bars each include at least first and second bus bar segments, the first and second bus bars lie in proximity with one another and are mirror symmetrical with respect to a median plane located therebetween, and wherein the secondary current component is concentrated primarily in the second bus bars segments, and the main current component flows so as to be substantially uniformly distributed in the first bus bar segments.

2. A converter bridge, as claimed in claim 1, wherein the second bus bars segments are in proximity with the median plane and exhibits a relatively small line cross section.

3. A converter bridge, as claimed in claim 2, wherein each of the first and second bus bars comprise two legs which form the bus bar segments and which form together an L-shaped profile.

4. A converter bridge, as claimed in claim 3, wherein the first and second bus bars form a U-shaped profile interrupted by the median plane.

5. A converter bridge, as claimed in claim 4, which comprise an insulator positioned along the median plane.

6. A converter bridge, as claimed in claim 1, wherein the first and second bus bars are made of copper.

* * * * *